United States Patent [19]

Stevenson

[11] Patent Number: 4,646,094
[45] Date of Patent: Feb. 24, 1987

[54] METHOD OF DISCRIMINATING BETWEEN SIGNALS

[75] Inventor: Theodore E. Stevenson, Bowie, Md.

[73] Assignee: The United States of America as represented by the Secretary of the Air Force, Washington, D.C.

[21] Appl. No.: 520,276

[22] Filed: Aug. 4, 1983

[51] Int. Cl.[4] .............................................. G01S 13/68
[52] U.S. Cl. .................................... 342/155; 342/425
[58] Field of Search ................ 343/7 A, 16 R, 16 LS, 343/18 E, 425, 428, 379

[56] References Cited

U.S. PATENT DOCUMENTS 3,735,403 5/1973 Sykes .............................. 343/16 R
4,224,622 9/1980 Schmidt ............................ 343/7.4

Primary Examiner—T. H. Tubbesing
Assistant Examiner—Gilberto Barrón, Jr.
Attorney, Agent, or Firm—William D. Auton; Donald J. Singer; Willard R. Matthews

[57] ABSTRACT

Discrimination between sidelobe and main beam reception of interference signals in a lobe on receive only radar is accomplished by a method of operation in which interference signals are stored and averaged for the radar receive beam positions of boresight, up, down, left and right. Interference signals received at boresight are compared with interference signals received at each off-boresight beam position. Interference signals received at boresight are also differenced with interference signals received at the off-boresight beam positions and the results are compared with beam width defining threshold factors. The determined values are applied to logic functions that indicate reception of interference signals outside of the main beam pattern.

4 Claims, 3 Drawing Figures

METHOD OF DISCRIMINATING BETWEEN SIGNALS

STATEMENT OF GOVERNMENT INTEREST

The invention described herein may be manufactured and used by or for the Government for governmental purposes without the payment of any royalty thereon.

BACKGROUND OF THE INVENTION

This invention relates to radar systems having a receive beam lobing capability and in particular to a method of discriminating between sidelobe and main beam reception of interference signal.

The traditional approach to sidelobe/main discrimination is to use a "guard horn", i.e., a second antenna which has an essentially omnidirectional receiving pattern. In this scheme, the guard horn omni pattern exceeds the sidelobe level of the "main" antenna, but has less power gain than the main beam. If the signal from the guard horn exceeds that from the main antenna, then the signal is being received by a sidelobe of the main antenna; otherwise it is being received by the main beam of the main antenna. Unfortunately, this approach makes use of two channels, one for the guard horn, and one for the main antenna, which along with the guard horn, makes the system more costly, heavier and larger than a single channel system.

Another approach, one which makes use of only one antenna, is possible when monopulse is used. In this approach a sum signal, an azimuth difference signal, and an elevation difference signal are produced for the purpose of target track via skin returns. In effect, separate sum and difference patterns are simultaneously produced. As a natural result of this approach, discrimination between interference received by the sidelobes and the main beam of sum pattern is made possible by comparison of sum and difference signal amplitudes. That is, the difference pattern effectively acts as a guard horn for the sum pattern, and the same logic applies as before. Unfortunately, this approach makes use of up to three channels; one for the sum, one for the azimuth difference, and one for the elevation difference. Again, therefore, there are shortcomings in cost, weight and volume in the overall design.

A third radar design concept, namely, single-channel, sequential LORO (lobe-on-receive only) neither has a guard horn nor monopulse signals. Instead, the receiving pattern is sequentially lobed "left", "right", "up" and "down" relative to the antenna main axis; in addition, the receiving pattern is aligned with the boresight in the search mode. Hence, five LORO positions are essentially available. Although it is effective and light in weight, this radar is also subject to the sidelobe/main beam discrimination problem.

One possible, but not totally satisfying approach to solving the problem, consists of desensitizing the receiver (i.e., automatically turning down its gain) during alternate (or otherwise sufficiently frequent) interpulse periods. This method determines that the interfering signal is being received in the sidelobe region of the search beam whenever the signal drops below a prescribed threshold (relative to system thermal noise) during the desensitized measurement. However, while this method may be able to distinguish between sidelobe and main beam reception of relatively strong interference, it cannot always correctly determine that a moderate or weak signal is received by the main beam alone, nor is the sidelobe/main beam breakpoint easily controlled by means of threshold comparison.

It is apparent from the foregoing that there currently exists the need for means to distinguish between sidelobe and main beam interference signals (including moderate and weak interference signals), which means must be implemented without adding appreciable cost and complexity to the radar system. The present invention is directed toward satisfying that need.

SUMMARY OF THE INVENTION

The invention is directed to a method for discriminating between sidelobe and main beam reception of interference signals as well as target tracking in radar systems having receive beam lobing capability such as the single channel, sequential lobe-on-receive-only (LORO) radar. In practicing the invention on the LORO radar, five LORO beam pattern positions, left, right, up, down lobing relative to antenna main axis during target tracking and alignment of receiving pattern with antenna boresight axis during search modes are used for the purpose of sidelobe/main beam discrimination. Sidelobe reception is tested by sensing to determine if interference signals have been received by the search pattern main beam or its sidelobes. This is accomplished by comparing the averaged interference signal for the boresight beam position with the averaged interference signal of each off-boresight beam position; differencing the averaged interference signal received at the boresight beam position with the averaged interference signals received at each off-boresight beam position and comparing the result with beam width defining threshold factors; and applying the results to logic equations that indicate reception of interference signals outside of the main beam pattern when appropriate conditions are met.

It is a principal object of the invention to provide a new and improved method for discriminating between sidelobe and main beam reception of interference signals in a radar system.

It is another object of the invention to provide a method for discriminating between sidelobe and main beam reception of interference signals in a radar system that is effective with all interference signals including moderate and weak signals.

It is another object of the invention to provide a method for discriminating between sidelobe and main beam reception of interference signals that does not introduce the addition of appreciable cost and complexity to the radar system.

This together with other objects, features and advantages of the invention will become more readily apparent from the following detailed description when taken in conjunction with the illustrative embodiment in the accompanying drawings.

DETAILED DESCRIPTION OF THE PREFERRED EMBODIMENT

This invention comprises an effective method for discriminating between interference signals received by the sidelobe and the main beam of the search patterns of a radar of the type that has a receive beam lobing capability. An example of such a radar is the lobe on receive only (LORO) radar employed in U.S. Air Force F16 aircraft.

In this radar, the receiving pattern is sequentially lobed "left", "right", "up", and "down" relative to the antenna main axis during target track. In addition, the receiving pattern is aligned with the antenna boresight axis during the search mode. In effect, therefore, five LORO beam pattern positions are available. The method of the invention comprehends a unique application of all five LORO positions for the purpose of sidelobe/main beam discrimination.

Figure 1:
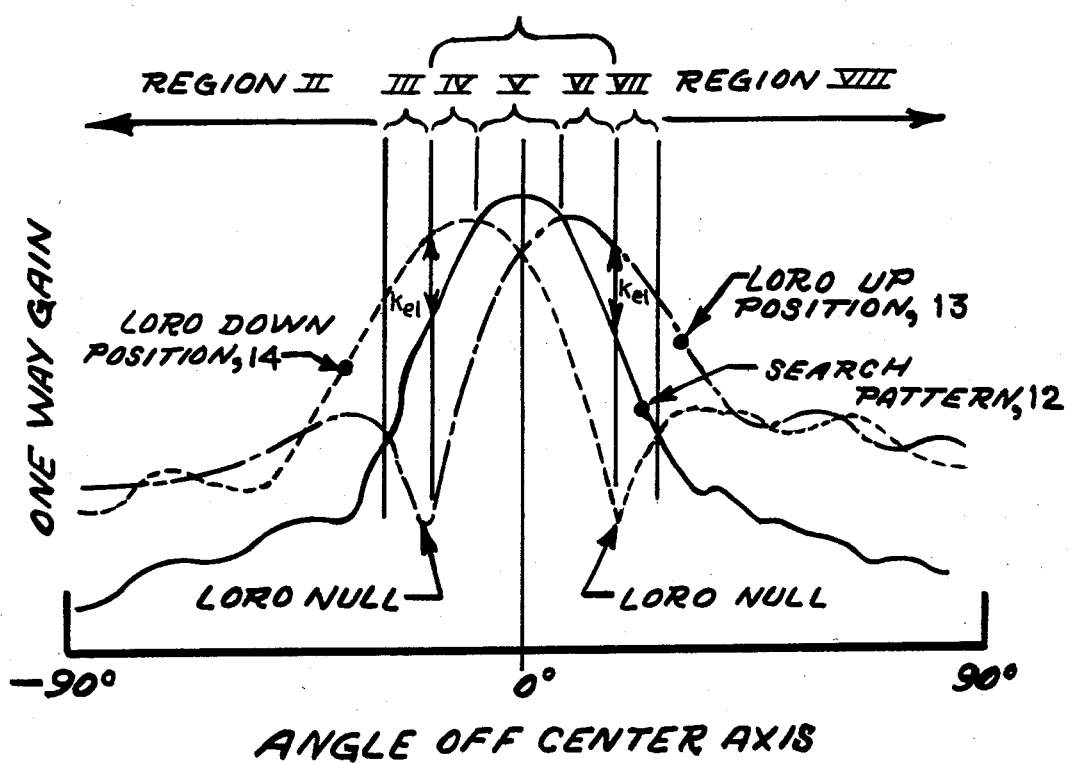
FIG. 1 is an illustration of beam patterns along the elevation principal plane for sidelobe/main beam discrimination using a single channel lobe on receive only radar.

FIG. 1 illustrates the concept in the elevation plane. Referring thereto beam patterns comprising search pattern 12, LORO up position pattern 13 and LORO down position pattern 14 are illustrated along the elevation principal planes. Region I, which corresponds to the main beam of the search pattern 12, is adjustable in width by means of threshold factor $K_{el}$. Similar patterns apply along the azimuth principal axis using LORO left and right positions and beam width in that plane is similarly adjusted by means of threshold factor $K_{az}$. The objective of the method of the invention is to determine whether an interference signal is received by the search pattern main beam, designated as Region I, or its sidelobes (Regions II, III, VII and VIII). It is possible to test directly for main beam reception by sensing Regions IV, V and VI, or to test for sidelobe reception by sensing Regions II, III, VII and VIII. The two approaches are similar in logic (one is logical inverse of the other) and equivalent in results. By way of example, the later approach is taken and hereinafter described in detail. It is to be noted, however, that the scope of the present invention encompasses both approaches.

In practicing the method of the invention interference signals received at each LORO position are stored and averaged. These values are then used to implement logic functions that distinguish between sidelobe and main beam reception of the interference signal. Implementation of the logic function hereinafter defined is subject to the following correspondences and definitions:

L=LORO Left Position
R=LORO Right Position
D=LORO Down Position
U=LORO Up Position
S=Search Beam Position
$\overline{M}_1$ = Average interference amplitude (above thermal noise by a threshold, $\Delta_1$, to be determined) received by position i, where i=L, R, D, U, or S.

By inspection of FIG. 1, the interference signal is determined to lie outside the main beam pattern (i.e., outside Region I) if conditions A1, A2, A3, B1, B2, and B3 are such that $$(A1 \text{ or } A2 \text{ or } A3) \text{ or } (B1 \text{ or } B2 \text{ or } B3) = \text{TRUE} \quad (1)$$

where these conditions are defined as follows:

| | |
|---|---|
| A1: $\overline{M}_S < \overline{M}_D$ and $\overline{M}_S < \overline{M}_U$ | [Regions II and VIII] |
| A2: $\overline{M}_S > \overline{M}_D$ and $(\overline{M}_U - \overline{M}_S) > K_{el}$ | [Region VII] |
| A3: $\overline{M}_S > \overline{M}_U$ and $(\overline{M}_D - \overline{M}_S) > K_{el}$ | [Region III] |
| B1: $\overline{M}_S < \overline{M}_R$ and $\overline{M}_S < \overline{M}_L$ | Analogous regions |
| B2: $\overline{M}_S > \overline{M}_R$ and $(\overline{M}_L - \overline{M}_S) > K_{az}$ | for azimuth |
| B3: $\overline{M}_S > \overline{M}_L$ and $(\overline{M}_R - \overline{M}_S) > K_{az}$ | comparisons | where $K_{el}$ and $K_{az}$ are receiver frequency-dependent, positive threshold (amplitude) factors.

Implementation of this logic may be by any suitable means such as, for instance, either handwire logic or a computer, along with appropriate memory to store and preprocess (average) the incoming data from the five-position LORO. The output is a logic flag which indicates either main beam reception (flag=1) or sidelobe reception (flag=0) of the interference signal. This flag can then be used for automatically determining whether (and how) to process the interference signal. The averaged data $\overline{M}_i$ may be appropriately formed from coherent, noncoherent or passive (listening) mode data. Threshold factors $K_{el}$ and $K_{az}$ may be adjusted to form the desired definition of main beam width. A flow diagram of the signal processing is presented in FIG. 2.

Figure 2:
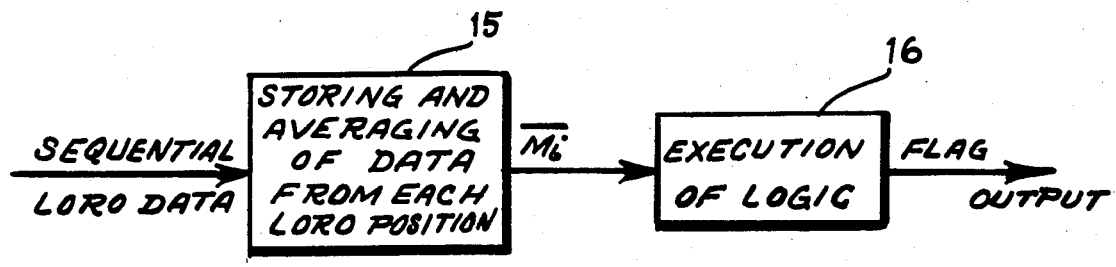
FIG. 2 is a block diagram of signal processing for single channel sidelobe/main beam discrimination.
Figure 3:
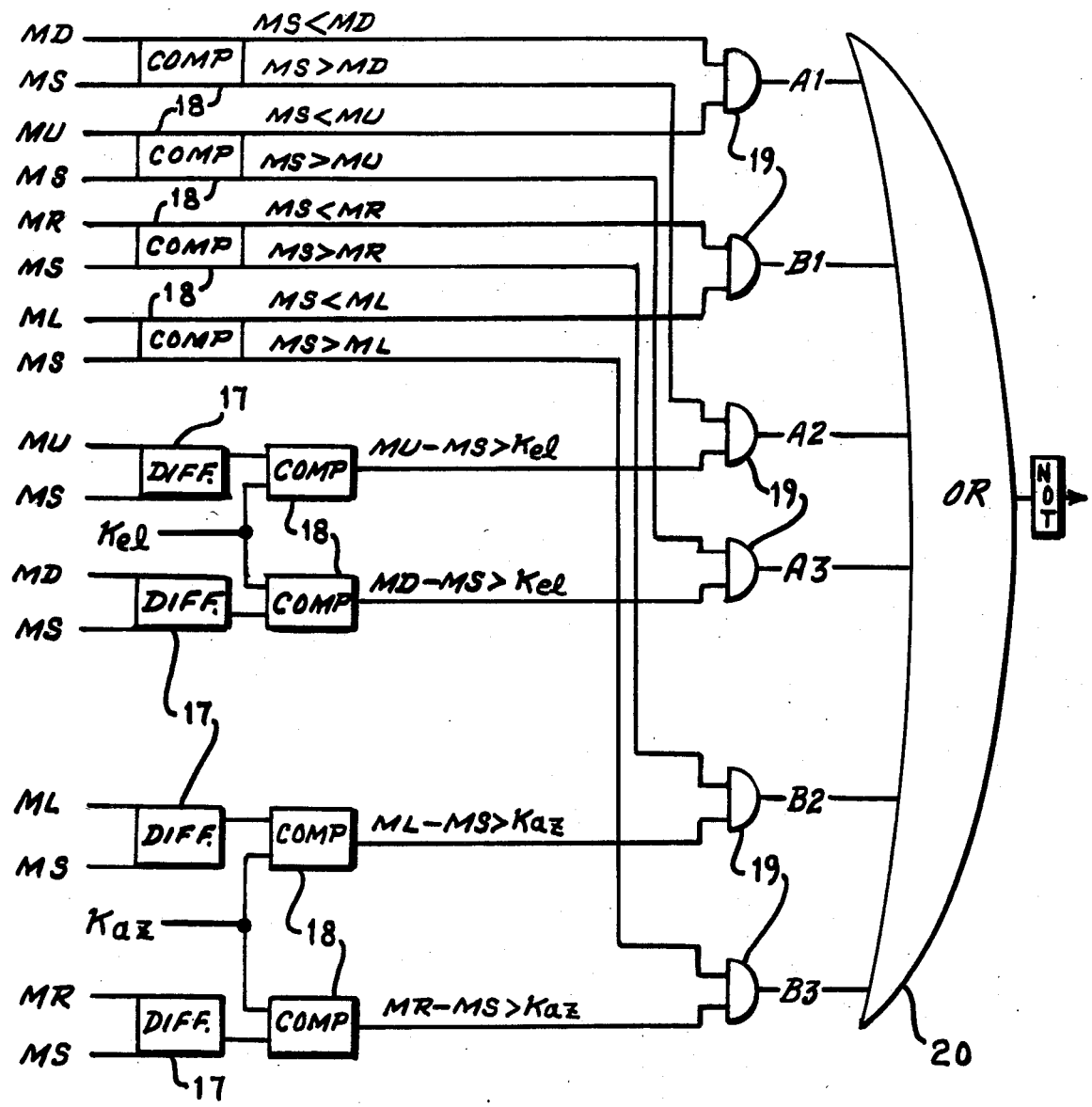
FIG. 3 is a logic circuit for implementing the logic function of FIG. 2.

The storing and averaging functions indicated by block 15 of FIG. 2 are accomplished by conventional radar processing circuits. A typical logic diagram for implementing the logic execution function of box 16 of FIG. 2 is illustrated by FIG. 3. Referring to FIG. 3, the circuit is comprised of differentiator 13, comparators 18, AND gates 19 and OR gate 20 illustrated thereby performs the logic function indicated and outputs the appropriate flag in response to existing interference signal conditions.

The 5-position LORO scheme may be used for target track as well as sidelobe/main beam discrimination of interference signals. In this manner, the LORO cycling mode is available for either or both.

Specifically, the four LORO off-boresight positions may be used for target angle track, as usual, while the 5th position (search) may be used for target range track. One advantage is that a higher antenna gain would then be available at boresight for range tracking. Normally detections from a pair of the off-boresight LORO patterns are combined for this purpose While the invention has been described in one presently preferred embodiment it is understood that the words which have been used are words of description rather than words of limitation and that changes within the purview of the appended claims may be made without departing from the scope and spirit of the invention in its broader aspects.

What is claimed is:

1. In a radar system in which the receive radar beam is sequentially lobed from boresight to multiple off-boresight positions and wherein the receive radar beam width is defined by receiver frequency dependent positive threshold factors $K_{el}$ and $K_{az}$, the method of discriminating between interference signals received by the main radar beam and interference signals received by radar beam sidelobes, said method comprising the steps of:
    sequentially lobing the receive beam from boresight through a multiplicity of off-boresight positions,
    storing interference signals received at each receive beam position,
    averaging each stored interference signal, and comparing the averaged interference signal for the boresight beam position with the averaged interference signal of each off-boresight beam position, whereby reception of interference signals by radar beam sidelobes is indicated for the condition in which the averaged interference signal of any one of the off-boresight beam position exceeds the average interference signal of the boresight beam position.

2. The method defined in claim 1 wherein the receive beam is lobed to up, down, left and right off-boresight beam positions.

3. The method as defined in claim 3 including the steps of:
   differencing the averaged interference signal for the boresight position with the averaged interference signal of the up off-boresight position and comparing the results thereof with threshold factor $K_{el}$,
   differencing the averaged interference signal for the boresight position with the averaged interference signal of the down off-boresight position and comparing the result thereof with the threshold factor $K_{el}$,
   differencing the averaged interference signal for the boresight position with the averaged interference signal of the left off-boresight position and comparing the result thereof with the threshold factor $K_{az}$,
   differencing the averaged interference signal for the boresight position with the averaged interference signal of the right off-boresight position and comparing the result thereof with the threshold factor $K_{az}$, and whereby reception of interference signals by radar beam sidelobes is further indicated for the conditions in which: (a) the averaged interference signal of the boresight beam position exceeds the averaged interference signal of the down off-boresight beam position and the averaged interference signal of the up off-boresight beam position exceeds the averaged interference signal of the boresight beam position by an amount greater than $K_{el}$; (b) the averaged interference signal of the boresight beam position exceeds the averaged interference signal of the up off-boresight beam position and the averaged intereference signal of the down off-boresight beam position exceeds the averaged interference signal of the boresight beam position by an amount greater than $K_{el}$; (c) the averaged interference signal of the boresight beam position exceeds the averaged interference signal of the right off-boresight beam position and the averaged interference signal of the left off-boresight position exceeds the averaged interference signal of the boresight beam position by an amount greater than $K_{az}$; and (d) the averaged interference signal of the boresight beam position exceeds the averaged interference signal of the left off-boresight beam position and the averaged interference signal of the right off-boresight beam position exceeds the averaged interference signal of the boresight beam position by an amount greater than $K_{az}$.

4. In a lobe on receive only radar in which the receive beam is lobed sequentially through boresight, up, down, left and right positions and wherein the beam width is defined by receiver frequency dependent threshold factors $K_{el}$ and $K_{az}$, the improvement residing in a method of operating said radar to discriminate between interference signals received by the main beam and interference signals received by sidelobes, said method comprising the steps of:
   sequentially lobing the radar receive beam through boresight, and up, down, left and right off-boresight positions,
   storing the interference signals received at each receive beam position,
   identifying an interference signal as being outside the main beam pattern when conditions A1, A2, A3, B1, B2, B3 are such that:

(A1 or A2 or A3) or (B1 or B2 or B3)=TRUE;

where A1, A2, A3, B1, B2, B3 are defined as
   A1: $\overline{M}_S < \overline{M}_D$ and $\overline{M}_S < \overline{M}_U$
   A2: $\overline{M}_S > \overline{M}_D$ and $(\overline{M}_U - \overline{M}_S) > K_{el}$
   A3: $\overline{M}_s > \overline{M}_U$ and $(\overline{M}_D - \overline{M}_S) > K_{el}$
   B1: $\overline{M}_S < \overline{M}_R$ and $\overline{M}_S < \overline{M}_L$
   B2: $\overline{M}_S > \overline{M}_R$ and $(\overline{M}_L - \overline{M}_S) > K_{az}$
   B3: $\overline{M}_S > \overline{M}_L$ and $(\overline{M}_R - \overline{M}_S) > K_{az}$
   and wherein M is defined as the average interference amplitude received by a given beam position and subsscripts S, U, D, L and R designate respectively the beam positions of boresight, up, down, left and right.

* * * * *